US010909167B1

(12) United States Patent
Almog et al.

(10) Patent No.: US 10,909,167 B1
(45) Date of Patent: Feb. 2, 2021

(54) SYSTEMS AND METHODS FOR ORGANIZING AN IMAGE GALLERY

(71) Applicant: PURE MEMORIES LTD, Ramat Hasharon (IL)

(72) Inventors: Ophir Almog, Ramat Gan (IL); Lev Oren, Ramat Hasharon (IL); Daniel Kashmir, Tel Aviv (IL)

(73) Assignee: PURE MEMORIES LTD, Ramat Hasharon (IL)

( * ) Notice: Subject to any disclaimer, the term of this patent is extended or adjusted under 35 U.S.C. 154(b) by 0 days.

(21) Appl. No.: 17/023,510

(22) Filed: Sep. 17, 2020

(51) Int. Cl.
*G06F 16/55* (2019.01)
*G06F 16/538* (2019.01)
*G06F 16/535* (2019.01)
*G06F 16/58* (2019.01)

(52) U.S. Cl.
CPC .......... *G06F 16/55* (2019.01); *G06F 16/535* (2019.01); *G06F 16/538* (2019.01); *G06F 16/58* (2019.01)

(58) Field of Classification Search
CPC ........ G06F 16/55; G06F 16/58; G06F 16/535; G06F 16/538; G06F 16/951; G06F 16/958; G06F 16/285; G06F 16/435; G06F 16/906; G06F 16/215; G06F 16/45
See application file for complete search history.

(56) References Cited

U.S. PATENT DOCUMENTS

| 9,934,450 B2 | 4/2018 | Bercovich et al. | |
| 2014/0188994 A1* | 7/2014 | Patterson | H04L 67/22 709/204 |
| 2014/0297645 A1* | 10/2014 | Cohen | G06F 16/51 707/737 |
| 2016/0342856 A1* | 11/2016 | Krenzer | G06T 7/337 |

OTHER PUBLICATIONS

P. Anandajayam et al; Preferences Extraction and Ranking Functions in Mobile Search; ICICES2014—S.A. Engineering College, Chennai, Tamil Nadu, India, Apr. 3, 2019.
Almog O., 2002. "Accuracy and Reliability of Transformation: Geometrical and Topological Aspects". Thesis Research. Technion—Israel Institute of Technology.

* cited by examiner

*Primary Examiner* — Angelica Ruiz
(74) *Attorney, Agent, or Firm* — Pearl Cohen Zedek Latzer Baratz LLP

(57) ABSTRACT

A system and method for selecting a subset of images may include: obtaining a plurality of image files, each image file relating to a digital image of the plurality of digital images, each file including image data and metadata, the metadata including a first set of features, and a second set of features; clustering the plurality of images based on at least one of the first set of features to generate clusters of images; selecting a set of M largest clusters of images, wherein M is a positive integer; scoring the images of each of the selected clusters based on at least one of the second set of features; and selecting a set of N images with a highest score from the selected clusters, wherein N is a positive integer.

20 Claims, 8 Drawing Sheets

SYSTEMS AND METHODS FOR ORGANIZING AN IMAGE GALLERY

FIELD OF THE INVENTION

The present invention relates generally to organizing an electronic or digital image gallery, and specifically to selecting images from an image gallery of a user.

BACKGROUND

A typical electronic or digital image gallery of a user, e.g. stored on a computer file system, may contain thousands of images in different qualities and meaning, including huge amounts of disposable and worthless images, alongside images containing the most valuable and precious digital memories of the user. The easiness of taking and storing images using current mobile devices has greatly increased the number of images stored. The task of navigating and managing those huge amounts of images may be tedious and time consuming, instead of enjoyable. Some users may find the task of managing and sorting their image gallery overwhelming, while others may spend considerable time selecting images from the mass of images in their gallery.

Current cameras typically provide metadata, e.g. data separate from but related to the substantive image data, that is related to or describing the images. The metadata may include for example location features, time features, image quality features, and other features. Some solutions may assist users by using the metadata for filtering out (e.g. removing) lower quality images. While this may provide some help, it may not be enough for large collections of images. Other solutions may use content detections algorithms, provided in a computer vision library of mobile devices, e.g., proprietary or commercial off-the-shelf (COTS) computer vision tools, to detect the content of images. However, scanning a large volume of images may be a computationally intensive task, and thus may take long time to complete on a typical mobile device (e.g., a smartphone). Thus, it may not be feasible to sort images based on content locally on the mobile device, e.g., sorting may require processing images stored on the "cloud" (typically remote, server-based storage systems).

SUMMARY

According to embodiments of the invention, a system and method for selecting a subset of images may include: obtaining a plurality of image files, each image file relating to a digital image of the plurality of digital images, each file including image data and metadata, the metadata including a first set of features, and a second set of features; clustering the plurality of images based on at least one of the first set of features to generate clusters of images; selecting a set of M largest clusters of images, wherein M is a positive integer; scoring the images of each of the selected clusters based on at least one of the second set of features; and selecting a set of N images with a highest score from the selected clusters, wherein N is a positive integer.

Embodiments of the invention may include obtaining content of each of the images pertaining to the selected clusters; and obtaining user preferences, and calculating the score to reflect the level of agreement between the user preferences and the content.

According to embodiments of the invention, the second set of features may include image quality features, where scoring the images of each of the selected clusters may be performed based on the image quality features.

Embodiments of the invention may include obtaining user preferences, where scoring the images of each of the selected clusters may be performed to reflect the level of agreement between the user preferences and the metadata features.

Embodiments of the invention may include presenting the selected images to a user.

According to embodiments of the invention, the first set of features may include time features related to a time in which the image was taken, and location features related to a location in which the image was taken, where clustering may include: clustering the plurality of images based on the location features to generate location-based clusters; and clustering the plurality of images based on the time features to generate time-based clusters.

According to embodiments of the invention, clustering may include clustering the location-based clusters based on time features to generate location-time clusters.

According to embodiments of the invention, clustering the plurality of images based on the time the image was taken may be repeated for a plurality of time scales.

According to embodiments of the invention, clustering may be performed by: obtaining feature values of each image from the metadata; setting an influence radius; assigning an influence function to each image, wherein the influence function is maximal at a position of the image and decays along the influence radius around the position of the image:

for each image position, summing values of all the influence functions of all the images; and assigning images to clusters based on the influence values.

According to embodiments of the invention, assigning images to clusters may include: repeating until all images are assigned to a cluster: selecting an image with the highest summed influence value, that is not yet assigned to a cluster, to be a center of a cluster; and assigning all images with a distance lower than the influence radius from the selected image to the cluster.

According to embodiments of the invention, the influence function may decay linearly.

According to embodiments of the invention, a system and method for selecting digital images from a plurality of digital images, may include: obtaining image data and characteristics of each digital image from the plurality of digital images; grouping the plurality of digital images to time-based groups and location-based groups; selecting at least one group having the most images; ranking the images of each of the at least one selected group based on at least one quality characteristic of the images; and selecting N highest ranked image from the at least one selected group, wherein N is a positive integer.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
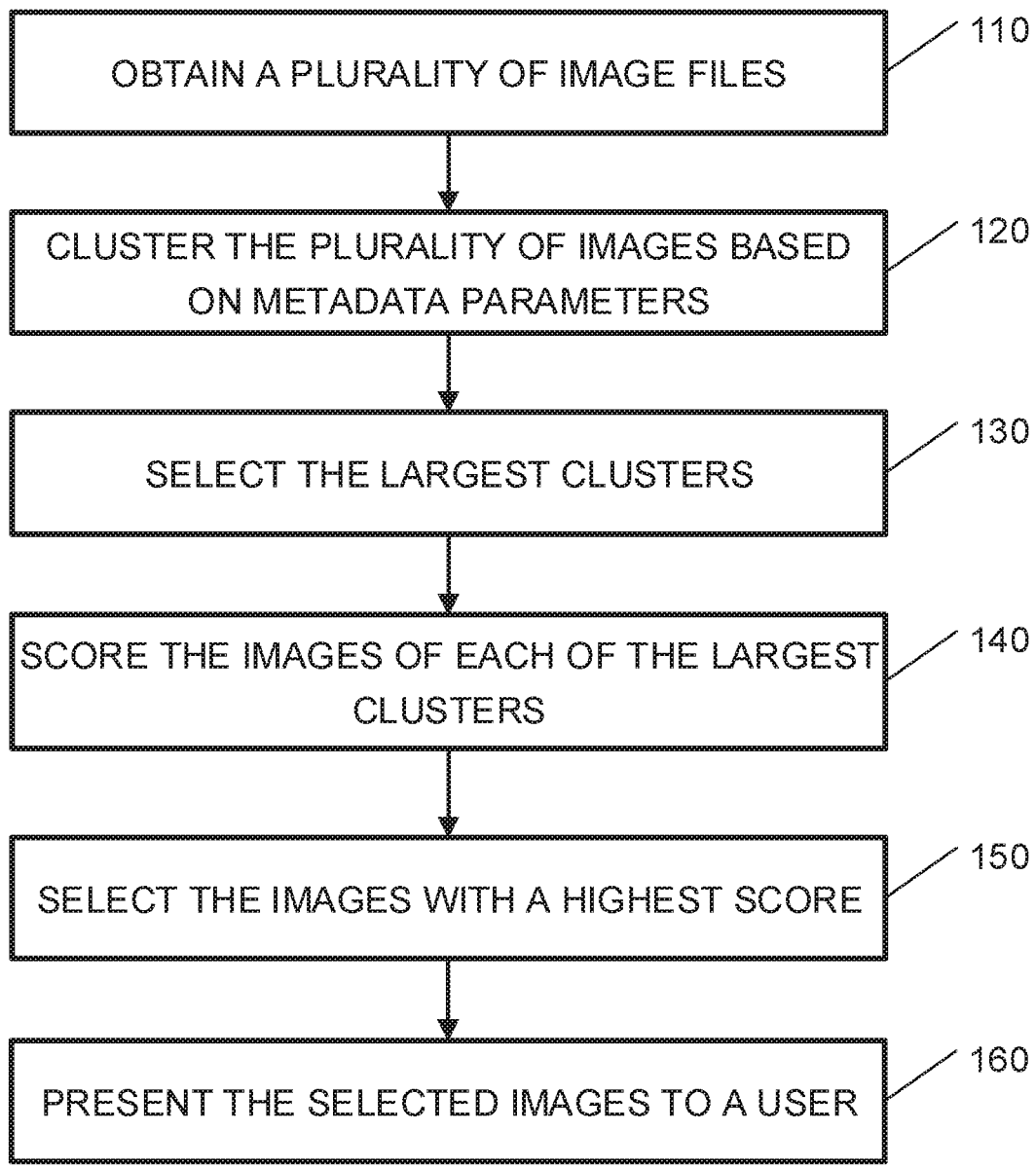
FIG. 1 is a flowchart of a method for selecting a subset of digital images, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating." "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may provide a system and method for selecting a subset of digital images from a plurality of digital images. For example, the plurality of digital images may form an image gallery of a user. A typical image gallery of a user may contain thousands of images with different content and qualities. Embodiments of the invention may provide an efficient method for scoring images and selecting a subset of images from the plurality of digital images, based on location, time content and quality of the images. According to embodiments of the invention, selection of the subset of images may consider the content of the images, but may still require relatively low computational power and may be performed relatively quickly on a mobile device.

A digital image, also referred to herein simply as an image, may include visual (e.g., optical) representation of physical objects provided in any applicable digital format. Images may include simple two-dimensional (2D) array or matrix of pixels, e.g., values representing one or more light wavelengths or one or more ranges of light wavelength, within or beyond the visible light, in specified locations, or any other digital representation, provided in any applicable digital format such as jpg, bmp, tiff, etc. images may also include panchromatic images, multispectral images and explicit point cloud generated using laser, such as Lidar (Light detection and ranging), e.g., embedded in IPAD pro, or to a multi spectral cube including optical information in various wavelengths in the range of: 400-2500 nano meters.

A digital image may be provided in a digital image file containing image data and metadata. The metadata may describe or include descriptors or values for a plurality of features describing characteristics, qualities or attributes of the image. For example, metadata features or descriptions may include or represent time features, e.g., features related to a time the image was taken, captured or created (e.g. image capture time and date from a camera), location features, e.g., features related to a location in which the image was taken, and quality features, e.g., features related to measures of quality of the image, e.g., brightness, sharpness, illumination, focal length, rear\front camera etc. Some of the metadata features may be measured and logged during image acquisition (e.g., in exif file embedded in the image file). Other metadata features may be provided by the system (e.g., other applications of the smartphone) and from connected devices that may provide information about the image (e.g. air-pods that may provide the capture spatial direction of the image). According to embodiments of the invention, the metadata may be enriched with features calculated based on user preferences and on the image data, e.g., using standard or proprietary image processing tools to extract features, as disclosed herein.

According to embodiments of the invention, images in an image gallery may be divided into groups based on common or similar characteristics, e.g., clustered based on metadata features, specifically time and location features. It may be assumed that a set of images captured within a daily, hourly or minute-based time frame may have content closer to each other relative to images captured at larger time intervals. Similarly, a set of images taken few meters from each other are more likely to contains similar or related content. Additionally, a specific location in which images have been captured several times may indicate a point of interest to the user.

Current work in the field of computer vision and artificial intelligence (AI) for understanding an image (e.g., where it is located, what is the content of the image, what is being captured, relevancy, etc.) usually require supervised learning that relies on manual tagging, at least for a learning phase. However, clustering the images into similarity groups based on location and time may eliminate the need of manual tagging and significantly increase the information that can be extracted from the images autonomously by the system. Adding user preferences and general tagging (e.g., identification of presence of persons, pets and objects in the images and adding such information to image files) may improve the comprehension of what images are likely to be of value to the user.

According to embodiments of the invention, the entire image gallery may first be divided into clusters or groups. Clustering or grouping may be performed in a first stage based only on the metadata provided by the camera, and specifically on location features and time features. For example, clustering may be performed based on location features to provide location-based clusters, e.g., clusters of images taken or captured at a single location (e.g., at a specified geographical location or within a specific distance from one another). Additionally or alternatively, clustering may be performed based on timing features to provide time-based clusters, e.g., clusters of images taken or captured at a close time intervals. Additionally or alternatively, clustering may be performed based on timing and location features to provide time-location clusters.

According to embodiments of the invention, clustering may divide the image gallery into subgroups or clusters with common or related theme or meaning, e.g., location clusters may include images taken at home, at work etc., time based clusters may include images taken at a single trip or party etc. Specially, while not all clusters may have a related theme or meaning, it is believed that at least the largest clusters (e.g., the location-based clusters, time based clusters, or any other clusters containing the most images, or a number of images above a threshold number) may have common or related theme or meaning, and that the theme or meaning of images in the largest clusters is important or meaningful to the user.

Thus, according to embodiments of the invention, the first stage in selecting the subset of images may include selecting a set of M largest clusters (where M is a positive integer, e.g., a whole number equal or larger than 1) and discarding smaller clusters. The set of M largest clusters may include one or more clusters containing the most images, larger number of images with relation to other clusters, or a number of images above a threshold number. For example, the clusters may be ordered based on size, e.g., based on the number of images each cluster contains and the set of clusters having the most images may be selected. According to embodiments of the invention, large clusters (e.g., clusters with image number above a threshold) may be further clustered to provide smaller clusters. For example, location-based clusters may be further clustered based on time the image was taken to generate location-time clusters. Clustering images based on metadata may require relatively low computational power, in comparison to the computational power required for content detection. Thus, a first stage of selection may be performed quickly.

According to embodiments of the invention, quality features in the metadata may be used to filter out low quality images. For example, in many smartphone cameras, quality features may include features related to sharpness, red eyes, illumination etc. For example, a quality score may be calculated for each image based on the quality features in the metadata, and images with quality score below a threshold may be filtered out or removed from the selected clusters.

According to embodiments of the invention, each of the images pertaining to the M largest clusters (e.g. those containing the most images, or a number of images above a threshold number) may be analyzed to detect content of the images. For example, standard or proprietary image processing tools may be used to detect and identify objects and features in the images. For example, tagging algorithms provided as part of a mobile device computer vision library (e.g. COTS and other open source libraries) may be applied on each image. The tagging process may detect or recognize faces including, eyes, mouths, nose, state of the eyes e.g., red eye, blinking etc., state of feeling such as smiling and more, pets, common objects such as bowls, papers, tables, cars, plants and more. Eventually, a set of content tags may be provided and added to the metadata.

According to embodiments of the invention, the content tags may be used in various ways. For example, the content tags may be used to further cluster the images to content-based clusters. According to some embodiments, images may be selected from the M largest clusters based on the content. For example, it may be assumed that the most valuable content will be the most frequent content. Thus, images with the most frequent content may be selected from the M largest image clusters.

According to some embodiments, images in the M largest clusters may be scored or rated. For example, the score, grade or rate may be calculated based on the image quality, the image content and the user preferences. A subset of the images may be selected, e.g., based on the score. The subset may include images that are assumed to have value to the user. The selected images may be presented to the user. Thus, embodiments of the invention may improve the technologies of digital storage, computer file management, and of image gallery management by providing an efficient tool for sorting and selecting images based on content, quality and user preferences.

Reference is made to FIG. 1, which is a flowchart of a method for selecting a subset of digital images from a plurality of digital images, according to embodiments of the invention. An embodiment of a method for selecting a subset of digital images from a plurality of digital images may be performed, for example, by the example system shown in FIG. 8. As with other method flowcharts, operations of FIG. 1 may be used with operations in other flowcharts shown herein in some embodiment.

In operation 110, image data and metadata related to digital images of the plurality of digital images may be obtained. e.g., in a plurality of image files (e.g., image files 732). Each of the image files may relate to a single digital image (e.g., digital image 733), and may include image data and metadata (e.g., metadata 734), as provided by the system. In typical applications the metadata may include location features, time features, image quality features, and other features.

In operation 120 the plurality of images may be clustered based on at least one of the features of the metadata to generate clusters of images. According to embodiments of the invention, clustering may be performed using any applicable method or algorithm. Clustering may refer to dividing the plurality of images into groups, also referred to as clusters, so that images in a cluster would be more similar to each other than to images from other clusters, with relation to the features used for clustering. It is believed, however, that in most cases, images within the same cluster are more similar to each other with relation content as well, in comparison to images that were assigned into other clusters. Clustering may be performed based on any subset of one or more features from the metadata, using any applicable algorithm. The measure of similarity may depend on the specific algorithm used. Clustering methods may include for example, K-means, Gaussian mixture model (GMM), mean shift, spectral clustering, density-based spatial clustering of applications with noise (DBSCAN), hierarchical clustering, etc., or proprietary algorithms as disclosed herein.

For example, the time the image was taken may be used to cluster the plurality of images based on acquisition time, to generate time-based clusters, and location data may be used to cluster the plurality of images based on the acquisition location, to generate location-based clusters. According to some embodiments, time-based clustering and location-based clustering may be repeated several times with different time and location scales. For example, time-based clustering may be repeated or performed separately for time scales or ranges of minutes, hours and days. According to embodiments of the invention, clustering may be repeated if the metadata is enriched, to generate new clusters using the new metadata features.

As noted, clustering of the plurality of images may be performed several times, each time using different features for performing the clustering, to obtain a plurality of divisions into clusters. For example, clustering may be performed based on time (or several time scales) and based on location (or several location radiuses). Thus, the same plurality of images may be divided, once to a plurality of time-based clusters, and then to a plurality of location-based clusters. For example, each single image may be included in a plurality of time-based clusters and in a plurality of location-based clusters.

In operation 130, the M largest clusters of images may be selected, where M is a positive integer equal or larger than one. Other clusters, e.g., non-selected clusters, may discarded from the selection process. The non-selected clusters may be saved, however, for future uses. Selecting the larges clusters may help selecting images that are meaningful to the user, assuming that the user may take more photos or images at location or times that are more important for the user. Thus, by selecting the M largest clusters, the most important images are selected. For example, in some embodiments 10-30 largest location-based clusters and 10-30 largest time-based clusters may be selected. In some embodiments 20% largest location-based clusters and/or time-based clusters may be selected. Other selection criteria may be used.

In operation 140, images in the selected clusters may be scored. For example, scoring may be performed based on features of the metadata, or features of the metadata other than those used for clustering. For example, scoring may be performed based on quality features, e.g., brightness, sharpness, illumination, focal length, rear\front camera etc. For example, a grade or a score may be provided to each image for each quality feature and the quality score or grade may be calculated as an average or weighted sum of the grades or scores. Other algorithms for grading or scoring images based on quality metadata may be used.

In some embodiments, images may be scored based on user preferences and content. Image content may be obtained using any applicable method, as disclosed herein. For example, if user preferences are obtained or otherwise known, a score may be calculated to reflect the level of agreement between the user preferences and the metadata features and or the content. For example, images with content that is preferred by the user may obtain higher scores comparing with images without content that is preferred by the user. Similarly, if the user prefers selfies, images with metadata feature indicating that the image is a selfie may obtain higher scores comparing with images with metadata feature indicating that the image is not a selfie.

According to some embodiments, a score may be calculated based on content of the image. For example, content of images may be ordered by frequency of appearances in images, and images with more frequent content may get a higher score. In some embodiments, images with more detected content, e.g., images with more people in them may be assigned a higher score than images with less content. In some embodiments, the score or grade may be calculated based on a combination of one or more of the quality features, the content, and the user preferences, e.g., as an average, weighted sum or using any other function.

In operation 150, images may be selected from the selected clusters. For example, a predetermined number of images or a predetermined fraction or percent of images may be selected. According to some embodiments, the N highest ranked images or N images with the highest scores may be selected from the M selected clusters, e.g., a plurality of images each with a score above a threshold or each having a score higher than other images in the selected clusters may be selected, where N is a positive integer, e.g., a whole number equal or larger than one. According to some embodiments, selection is performed based on the scores as well as other criteria such as the distribution of the images among the clusters or the content of the images. For example, the number of selected images from a single cluster may be limited, so even if a single cluster includes all the N highest ranked images, images may be selected from other clusters as well. In some embodiments, the N highest ranked images from at least two or more clusters may be selected. In some embodiments, the selected images may all include specified content. For example, the best images (e.g., images with the highest scores) that include inferred or declared content may be selected. In some embodiments, the user may specify the required content for the selected images, thus, the best images (e.g., images with the highest scores) that include content specified by the user may be selected.

According to embodiments of the invention, a second stage of clustering may be performed for the selection of images from large clusters, e.g., clusters with a number of images that is above a threshold. For example, in a second stage of clustering, images pertaining to a single cluster (clustered based on a first feature) may be clustered based on the second feature. For example, location-based clustering may be performed in operation 120, and for selecting images from a large location-based cluster, the location-based cluster may be further clustered based on time thus generating time-location-based clusters. When selecting images from the large location-based cluster, the N highest ranked images from the time-location-based clusters that are closer in time to the selection date may be selected.

In operation 160, the selected images may be presented to the user. Thus, the user may obtain a selection of best images (e.g., images with the highest scores) quickly, without having to spend time navigating and choosing images from his entire image gallery. In some embodiments, the selected images may be used to generate an image album (e.g., a printable image album) for the user. Thus, if the user has specified required content for the selected images, e.g., in operation 150, the album may include a selection of best images (e.g., images with the highest scores) that include the required content.

Figure 2:
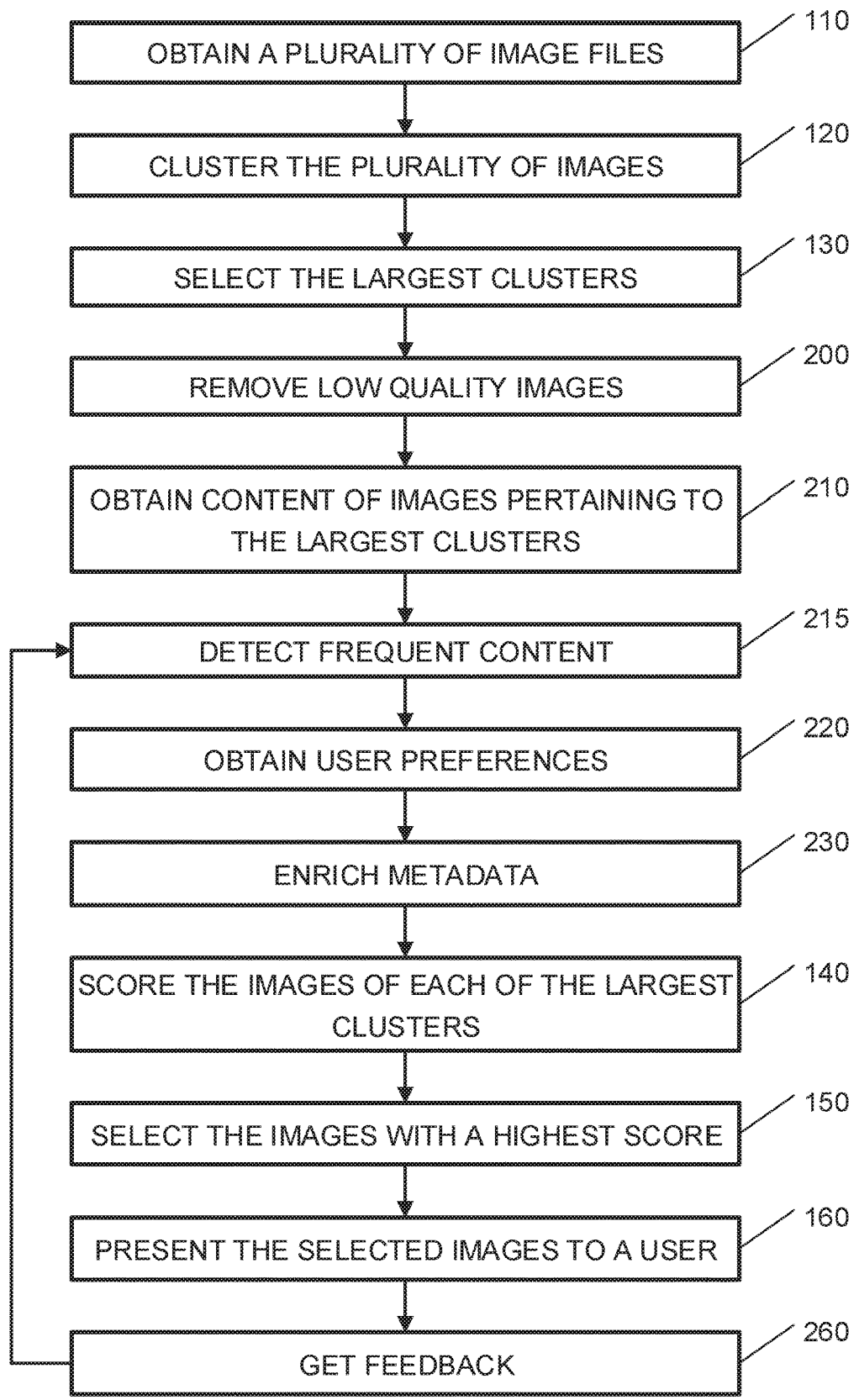
FIG. 2 is a flowchart of a method for selecting a subset of digital images using image clusters, according to embodiments of the invention.

Reference is made to FIG. 2, which is a flowchart of a method for selecting a subset of digital images from a plurality of digital images using image clusters, according to embodiments of the invention. An embodiment of a method for selecting a subset of digital images from a plurality of digital images using image clusters may be performed, for example, by the systems shown in FIG. 8. Some operations of embodiments of the method presented in FIG. 2 are identical to operations of embodiments of the method presented in FIG. 1. Those operations will be mentioned only briefly and will not be described again in detail.

Operations 110-130 are similar to operation 110-130 of FIG. 1. In operation 200, low quality images may be removed or discarded from the image gallery. For example, images may be scored based on quality features provided in the metadata e.g., brightness, sharpness, illumination, focal length, rear\front camera etc. For example, a quality grade or a score may be provided to each image for each quality feature and the quality score or grade of an image may be calculated as an average or weighted sum of the grades or scores. Other algorithms for grading or scoring images based on quality features may be used. In some embodiments, images with quality score below a threshold may be removed or discarded from the plurality of images.

In operation 210, content of each of the images pertaining to the M largest clusters may be obtained. For example, proprietary or standard content detections algorithms, also referred to as tagging algorithms, may be used to detect or identify content of images, e.g., to detect and identify objects and features in the images. The content detections algorithms may include the content detections algorithms provided in current mobile device computer vision library, e.g., COTS and other open source libraries. For example, the tagging algorithms provided as part of a mobile device computer vision library may be applied on each image of the selected clusters. The tagging process may detect or recognize people, faces including, eyes, mouths, nose, state of the eyes e.g., red eye, blinking etc., state of feeling such as smiling and more, pets, common objects such as bowls, papers, tables, cars, plants and more. While tagging is relatively computationally intensive process, performing tagging to relatively low number of images may be performed quickly and provide instant results to the user. In addition, images taken close to one another by time or location may include same or similar objects and content, so after detecting objects and content in one image, it may be much easier to detect the same objects and content in the close images, e.g., images from the same cluster.

In operation 215, frequent content may be detected. Frequent content may include content that is detected in large number of images, e.g., in a number of images that is above a threshold or in a percentage or fraction of the images that is above a threshold.

In operation 220 user preferences may be obtained. The user preferences may include information specifying content that is valuable to the user. The user preferences may be obtained using a questionnaire, e.g., by presenting questions to the user and obtaining user answers. User preferences that are obtained from answers of the user may be referred to herein as declared preferences. The questions may define the preferred content, for example the user may be asked about his hobbies and family, or about visual or composition preferences, for example, a user may be asked "Do you like to see teeth in your images?"

However, research shows that declared preferences tend to poorly describe the real preferences of the user. Therefore, user preferences may be learned automatically or derived from the content of the images. User preferences that are derived from the content of the images may be referred to herein as inferred preferences. For example, frequent content, e.g., content detected as frequent (e.g. frequently occurring in a user's image collection) in operation 215, may be categorized as preferred. For example, if cats appear in a percent of the images that is above a threshold, cats may be recognized as preferred content. In case of contradiction between the declared preferences and the inferred preferences, either both options may be recognized as preferred, or the inferred preferences may override the declared preferences.

In operation 230, the metadata may be enriched. The metadata may be enriched with content information obtained in operation 210, for example, a set of content tags may be added to the metadata. The metadata may be further enriched with user preferences obtained in operation 220.

In operation 140 images of each of the M largest clusters may be scored, in operation 150 N images with the highest scores may be selected, where N is a positive integer equal or larger than one, and in operation 160 the selected images may be presented to the user. In operation 260, feedback or input may be obtained from the user. The user may indicate whether the selected images are valuable to him. In some embodiments, the user may provide indication of valuable images that were not selected. The feedback from the user may be used to calibrate the user preferences.

As noted, clustering of images may be performed using any applicable method. A common clustering method is k-means. To use k-means, the system may obtain as input a set of unlabeled (explicit) list of observations (images), where each observation is a multi-dimensional real vector (e.g., an ordered list of values), specifically, x-y coordinates of where an image was captured for location-based clustering, and a time an image was captured for time-based clustering. The system may randomly guess the number of potential clusters k, choose k random observations from the list of observations, and set each of the selected observations as a center of a cluster. After selecting centers, the system may go over the observations in the list of observations, calculate a distance, e.g., Euclidian distance, between each observation j and each of the cluster's centers, and assign each point into the cluster with the closest center. Eventually, statistical parameters such as mean and standard deviation may be calculated for each cluster. The calculated mean of each cluster may be used as a cluster center in a next iteration. In each iteration, the system may rerun the assigning process according to the new centers and update the statistical parameters of each cluster. The process may terminate when there is no difference between two consecutive iterations. K-means clustering is generally accepted and is considered efficient to use. However, k-means clustering depends on an initial guess about the data structure, that often leads to a consequential cluster calculation that poorly describes the clustered data. Moreover, the common algorithm requires an a-priori assessment about the number of potential clusters from the user.

Embodiments of the invention may suggest an innovative clustering approach. According to embodiments of the invention, each observation may be perceived as producing one unit of influence that is induced to a pre-defined radius of influence. The influence absorbed by each point may be summed, and observations with high amount of influence may be selected to be a potential center of cluster.

Figure 3:
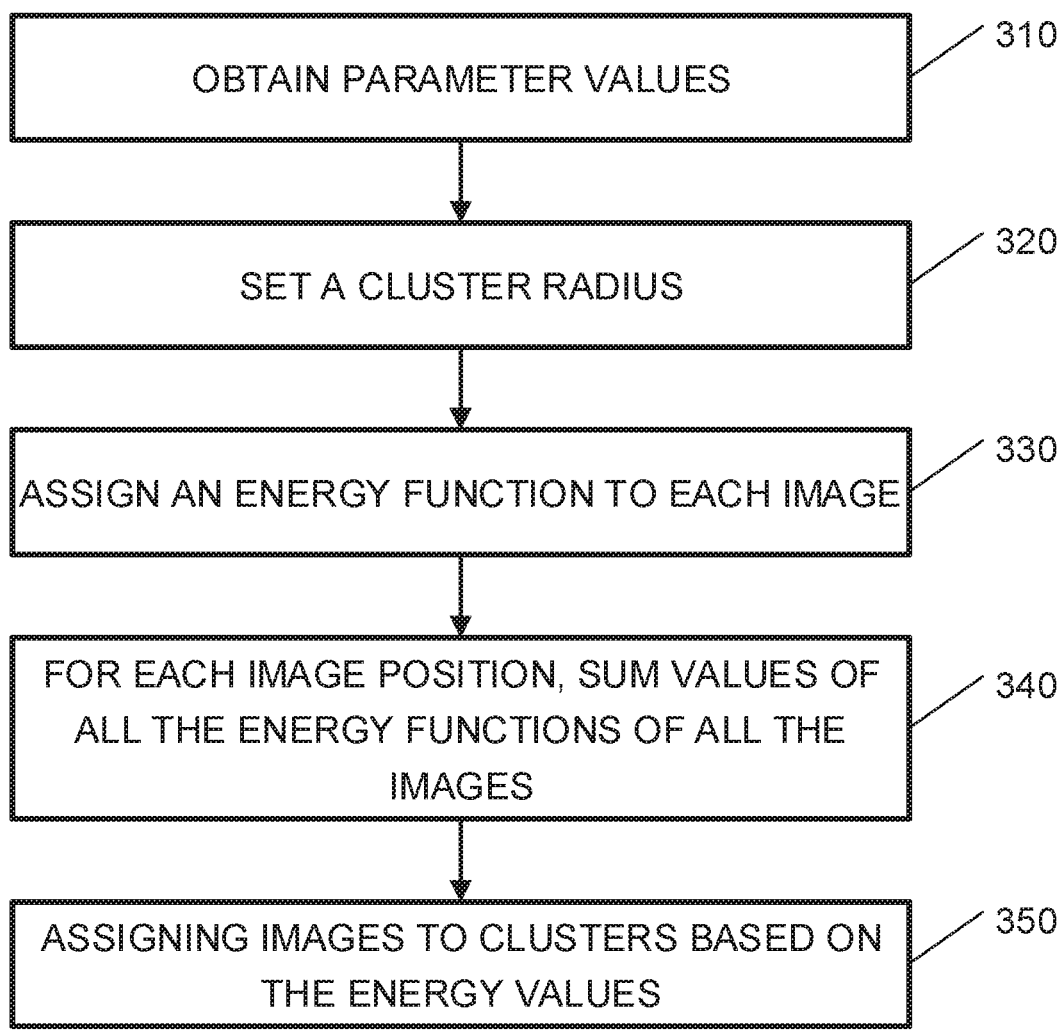
FIG. 3 is a flowchart of a method for clustering digital images, according to embodiments of the invention.

Reference is made to FIG. 3, which is a flowchart of a method for clustering digital images, according to embodiments of the invention. An embodiment of a method for clustering digital images may be an example for a clustering method that may be used in operation 120 presented in FIGS. 1 and 2. An embodiment of a method for clustering digital images may be performed, for example, by the systems shown in FIG. 8.

In operation 310, feature values of each image may be obtained from the metadata of images. For example, to perform time-based clustering, features regarding the time the image was taken or captured may be obtained, and to perform location-based clustering, features regarding the location the image was taken or captured may be obtained. Each feature may be provided in a form of a multi-dimensional real vector (e.g. an ordered series of numbers, each representing a feature), for example, x-y coordinates of where an image was captured for location-based clustering, and a time an image was captured for time-based clustering.

In operation 320, a cluster radius, also referred to as influence radius, may be set or selected. For example, when performing time-based clustering, the influence radius may be set to several minutes to perform minutes-scale clustering, to a few hours to perform hours-scale clustering, and to a few days to perform days-scale clustering. For performing location-based clustering, an initial influence radius of 30 meters may be used. Other influence radiuses may be used. In some embodiments, the influence radiuses may be adjusted based on clustering results, for example, if clusters that are too large are obtained, e.g., clusters having a number of images that is above a threshold, clustering may be repeated with smaller influence radius, and if clusters that are too small are obtained, e.g., clusters having a number of images that is below a threshold, clustering may be repeated with larger influence radius. In some embodiments, adjacent clusters may be united or combined to form a single cluster. This may improve the clustering process since adjacent clusters may share common content and therefore may be united. For example, if the distance between two clusters is lower than a threshold, e.g., 1.5 times the influence radius, than the clusters may be united to a single cluster. The distance may be Euclidean distance or a statistic distance such as Mahalanobis distance, e.g., a distance of a cluster radius and the distribution of image positions in a second cluster.

In operation 330, an influence function may be assigned to each position of an image (each image location is considered as an observation). In some embodiments, the influence function may be constant (e.g., equal a constant value) long a cluster radius or influence radius around the position of the image, and be set to zero elsewhere. Other influence functions may be used. For example, the influence function may be maximal at a position of the image and may decay gradually. e.g., linearly, exponentially, etc., along a cluster radius or influence radius around the position of the image. For example, when performing location-based clustering, the influence function may be maximal at the x-y location of the image, and for time-based clustering, the influence function may be maximal at the time the image was captured.

In operation 340, values of all the influence functions of all the images may be summed or otherwise combined per position. In some embodiments, values of all the influence functions of all the images may be summed or otherwise combined for each image position. In operation 350, images may be assigned to clusters based on the combined influence values. For example, assigning images to clusters may include an iterative process that may be repeated until all images are assigned to a cluster. In each iteration, a position, e.g., of an image or not, with the highest summed influence value, that is not yet assigned to a cluster, may be selected to be a center of a cluster, and all images with a distance lower than the influence radius from the selected image may be assigned to the cluster.

Figure 4:
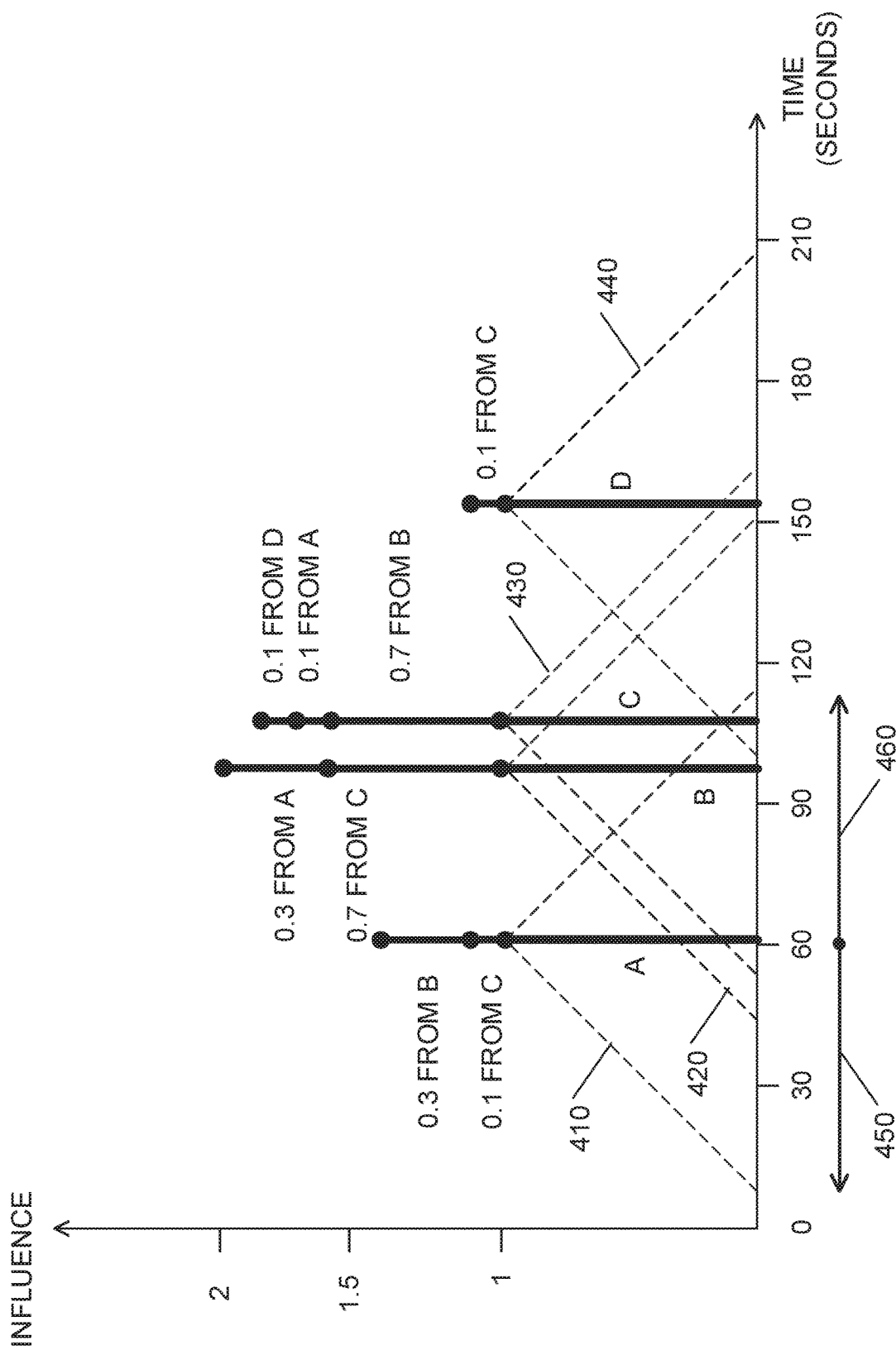
FIG. 4 depicts an example of clustering, according to embodiments of the invention.

Reference is now made to FIG. 4 which depicts an example of clustering according to embodiments of the invention. The non-limiting example in FIG. 4 includes a single dimension (1D) feature, e.g., time. However, as noted, the same clustering method may be performed in two-dimensions for location-based clustering and with as many dimensions as required. FIG. 4 includes capturing time of four images, image A taken at 60 seconds, image B at 95 seconds, image C at 105 seconds and image D at 150 seconds. Each image A, B, C and D is represented in FIG. 4 by an influence function 410, 420, 430 and 440, respectively. As can be seen, the influence function is maximal at the time the image was taken and decays linearly along the influence radius 450, 460 around the position of the image on the time scale. The maximal value of the influence function may be determined arbitrarily to any value, e.g., to one. The influence radius 450, 460 may be determined according to the scale of the clustering (here ~50 seconds). The bars in each image location represent the accumulated influence functions in each image location. For example, the accumulated influence functions in the position of image A includes a contribution of the influence function of images A, B and C. In the first iteration of assigning images to clusters, no image is assigned to a cluster, therefore, the image with the highest summed influence value, here image B, is selected to be a center of a first cluster. Next all images with a distance lower than the influence radius from the selected image, here images A and C, may be assigned to the first cluster. Then, an image with the highest summed influence value, that is not yet assigned to a cluster, may be selected to be a center of a second cluster. Here the only image that was not assigned to the first cluster is image D, which is assigned to the second cluster.

Embodiments of the method for selecting a subset of digital images from a plurality of digital images may be performed on an existing plurality of digital images, e.g., on an existing image gallery by an application downloaded to a smartphone. However, after being performed once, the selection of images may be dynamically updated whenever a new image is captured, or whenever a plurality of new images is captured, every predetermined time period, or when required by the user. According to embodiments of the invention, adding a new image to the plurality of digital images may be performed efficiently, without repeating the entire clustering process, by determining if the new image pertains to an existing cluster or not, as disclosed herein.

Figure 5:
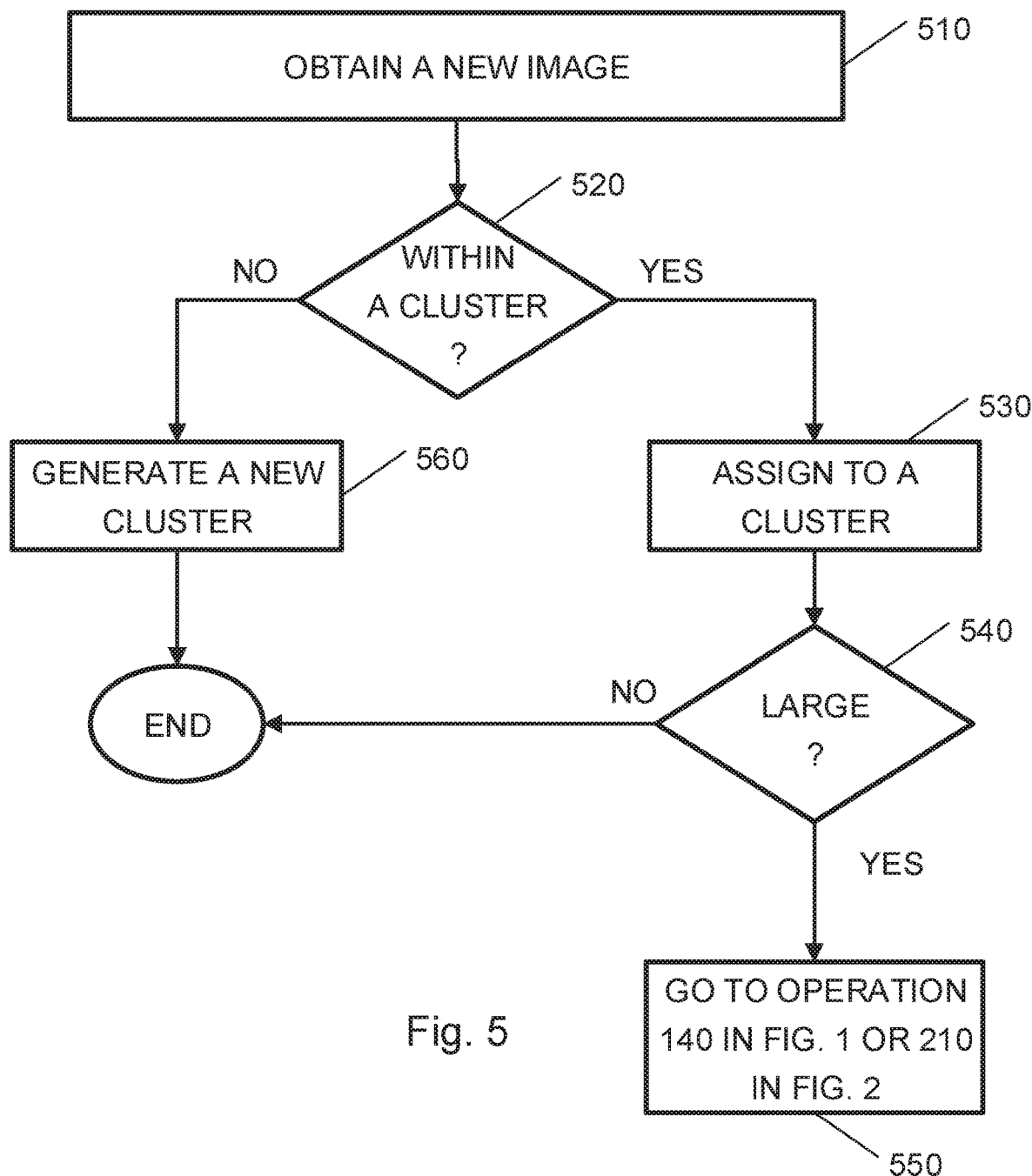
FIG. 5, is a flowchart of a method for adding new images to the plurality of digital images, according to embodiments of the invention.

Reference is made to FIG. 5, which is a flowchart of a method for adding new images to the plurality of digital images, according to embodiments of the invention. An embodiment of a method for adding new images to the plurality of digital images may be performed, for example, by the systems shown in FIG. 8. As with other flowcharts provided herein, some embodiments of the method presented in FIG. 5 may be combined with other embodiments described herein such as those presented in FIG. 1 and FIG. 2. An embodiment of a method for adding new images to the plurality of digital images may be performed, for example, whenever a new image is captured, or a plurality of new images are captured or added to the image gallery, or every predetermined time period, or when required by the user. However, in case more than one image is added, embodiments of the method for adding new images to the plurality of digital images may be performed for each new image.

In operation 510, a new image may be obtained or received. In operation 520, it may be checked and determined whether the new image belongs one or more of the existing clusters. For example, if the new image is within the influence radius of an existing cluster (e.g., within the influence radius of a cluster center), the new image may be added to that cluster. The new image may be added to more than one cluster, e.g., to one or more location-based clusters with different cluster scales and to one or more time-based clusters with different cluster scales, depending on the distance of the position of the new image from the clusters center. In operation 520, the new image is assigned to the clusters identified in operation 510.

In operation 540, it may be determined if at least one of the clusters to which the new image has been assigned to is a large cluster, e.g., using the same criteria as in operation 130. For example, the new image may be assigned to a cluster that was already determined to be a large cluster, making it even larger, or to a cluster that has become a large cluster following the addition of the new image. If it is determined that the cluster is a large cluster, the method may move to operation 140 in FIG. 1 or to operation 210 in FIG. 2. If the new image was assigned to a cluster that was already determined to be a large cluster, then in operation 140 only the new image may be scored. If the new image was assigned to a cluster that has become a large cluster following the addition of the new image, then in operation 140 the entire cluster may be scored, and the method may move to operations 150 and 160. Depending on the scores of the new image or the new cluster, the selection of images may change. Similarly, if the new image was assigned to a cluster that was already determined to be a large cluster, then:

- in operation 210 only the content of the new image may be obtained,
- in operation 220 the user preferences may be updated based on the content of the new image,
- in operation 230 the metadata of the new image may be enriched,
- in operation 140, the new image may be scored, and the method may continue to operation 150.

If the new image was assigned to a cluster that has become a large cluster following the addition of the new image, then:

- in operation 210 the content of the entire cluster may be obtained,
- in operation 220 the user preferences may be updated based on the content of the entire cluster,
- in operation 230 the metadata of images of the new cluster may be enriched.
- in operation 140, the images of the new cluster may be scored, and the method may continue to operation 150.

Thus, the selection of images may be updated dynamically, without having to repeat the entire clustering operation.

Figure 6:
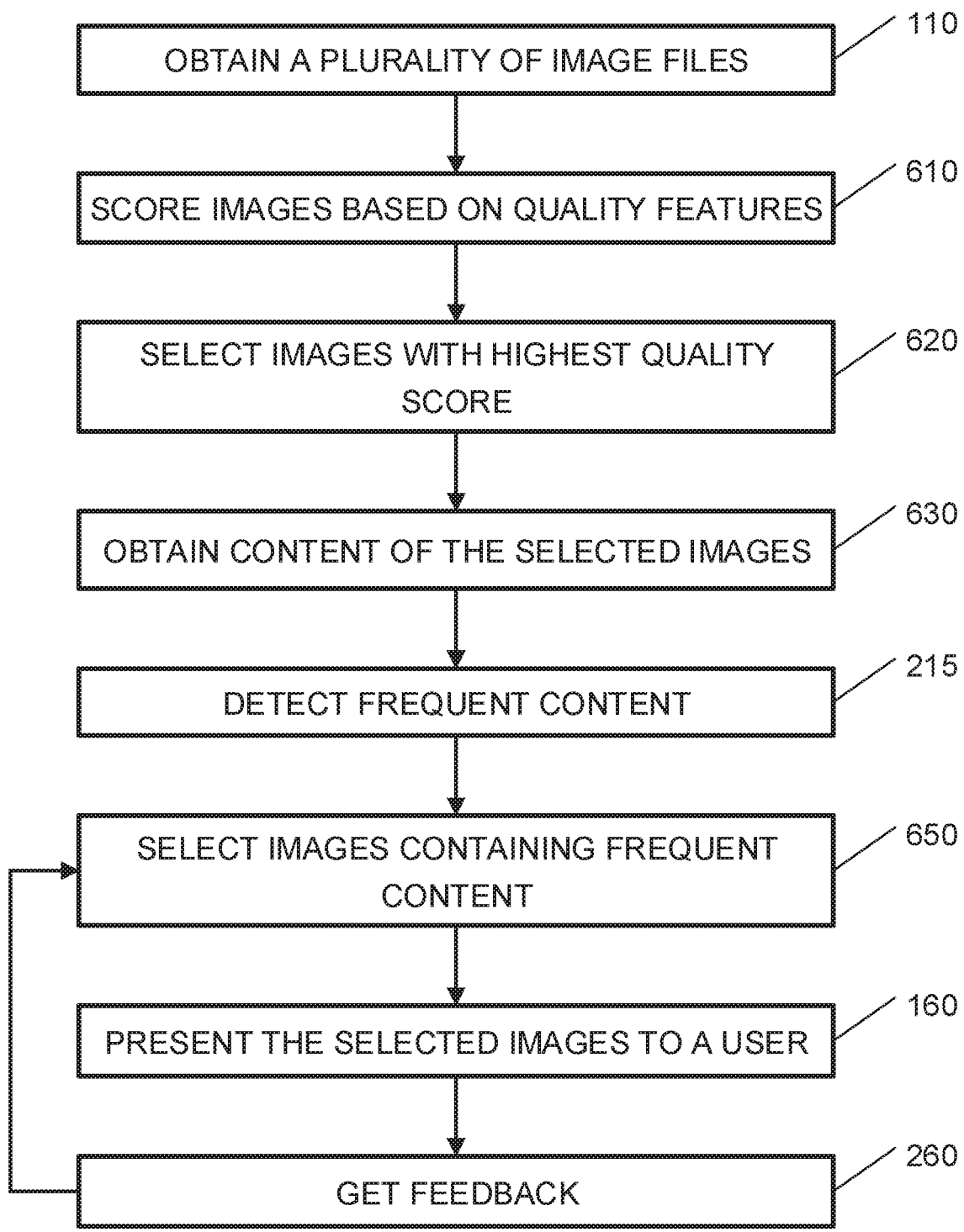
FIG. 6, which is a flowchart of a method for selecting a subset of digital images from a plurality of digital images based on frequent content, according to embodiments of the invention.

Reference is made to FIG. 6, which is a flowchart of a method for selecting a subset of digital images from a plurality of digital images based on frequent content, according to embodiments of the invention. An embodiment of a method for selecting a subset of digital images from a plurality of digital images based on frequent content may be performed, for example, by the systems shown in FIG. 8. Some operations of embodiments of the method presented in FIG. 6 are identical to operations of embodiments of the method presented in FIGS. 1 and 2. Those operations will be mentioned only briefly and will not be described again in detail.

In operation 110, image data and metadata related to digital images. In operation 610, each image may be scored based on quality features in the metadata. For example, a quality grade or a score may be provided to each image for each quality feature and the quality score or grade of an image may be calculated as an average, sum or weighted average or sum of the grades or scores. Other algorithms for grading or scoring images based on quality features may be used. In operation 620, images may be selected based on the quality score. For example, N images (e.g., a number of images, a fraction of the images, or a fraction of images up to a limit) with the highest scores may be selected.

In operation 630, content of the selected images may be obtained, in similar manner to operation 210. In operation 215, frequent content may be detected. In operation 650, images with frequent content may be selected. In some embodiments, the percentage, proportion or ratio of each type of frequent content in the images selected in operation 620 to the total number of images, may be preserved in the images selected in operation 650. For example, if the types of frequent content in the bulk of images selected in operation 620 includes 30% images with cats, 40% images with people, 10% images with sunset, and 20% images with other, less frequent, content, the subset of images selected in operation 650 may include images of cats, people and sunsets. In some embodiments, images including a plurality of types of selected content (e.g., people and cats) may be preferred over images containing less types of frequent content. The sum of all ratios may equal more than 100% since a single image may include more than one type of content, e.g., a single image may include a person, and an animal, etc. In operation 160, the selected images may be presented or displayed to the user or used to generate an image album. In operation 260, feedback may be obtained or received from the user.

Figure 7:
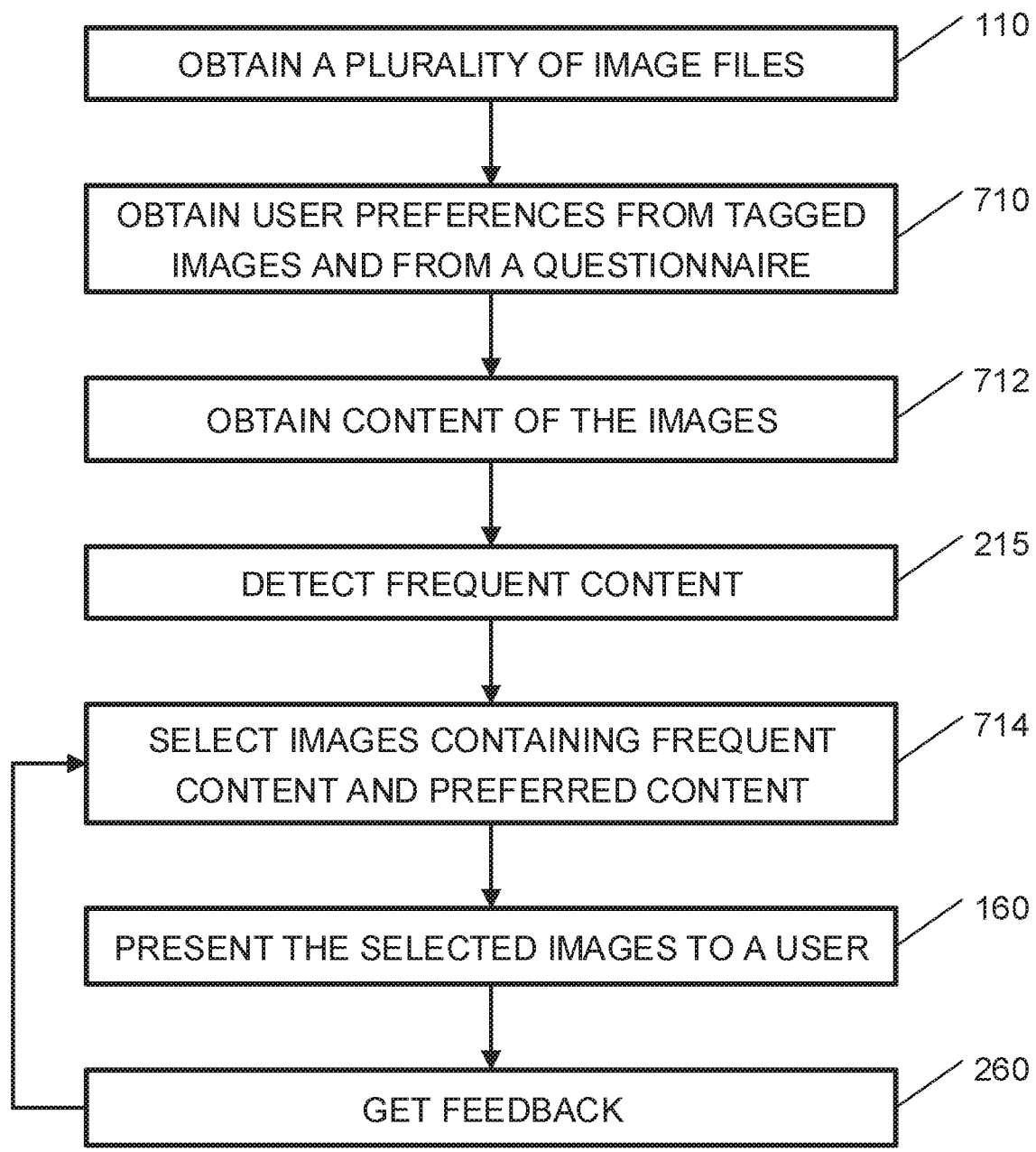
FIG. 7, which is a flowchart of a method for selecting a subset of digital images from a plurality of digital images based on user tagging, according to embodiments of the invention.

Reference is made to FIG. 7, which is a flowchart of a method for selecting a subset of digital images from a plurality of digital images based on user tagging, according to embodiments of the invention. An embodiment of a method for selecting a subset of digital images from a plurality of digital images based on frequent content based on user tagging may be performed, for example, by the systems shown in FIG. 8. Some operations of embodiments of the method presented in FIG. 7 are identical to operations of embodiments of the method presented in FIGS. 1 and 2. Those operations will be mentioned only briefly and will not be described again in detail.

In operation 110, image data and metadata related to digital images. In operation 710, user preferences may be obtained from images tagged by the user. For example, the user may be requested to select images with preferred content and tag the preferred content in the user selected images. In addition, user preferences may be obtained using a questionnaire. In operation 712, content of images of the plurality of images may be obtained (in similar way to operation 210). In operation 215, frequent content may be detected. In operation 714 images containing frequent content and preferred content may be selected. In operation 160, the selected images may be presented to the user. In operation 260, feedback may be obtained from the user. The user feedback may be used to adjust the user preferences and refine the selection of images.

Figure 8:
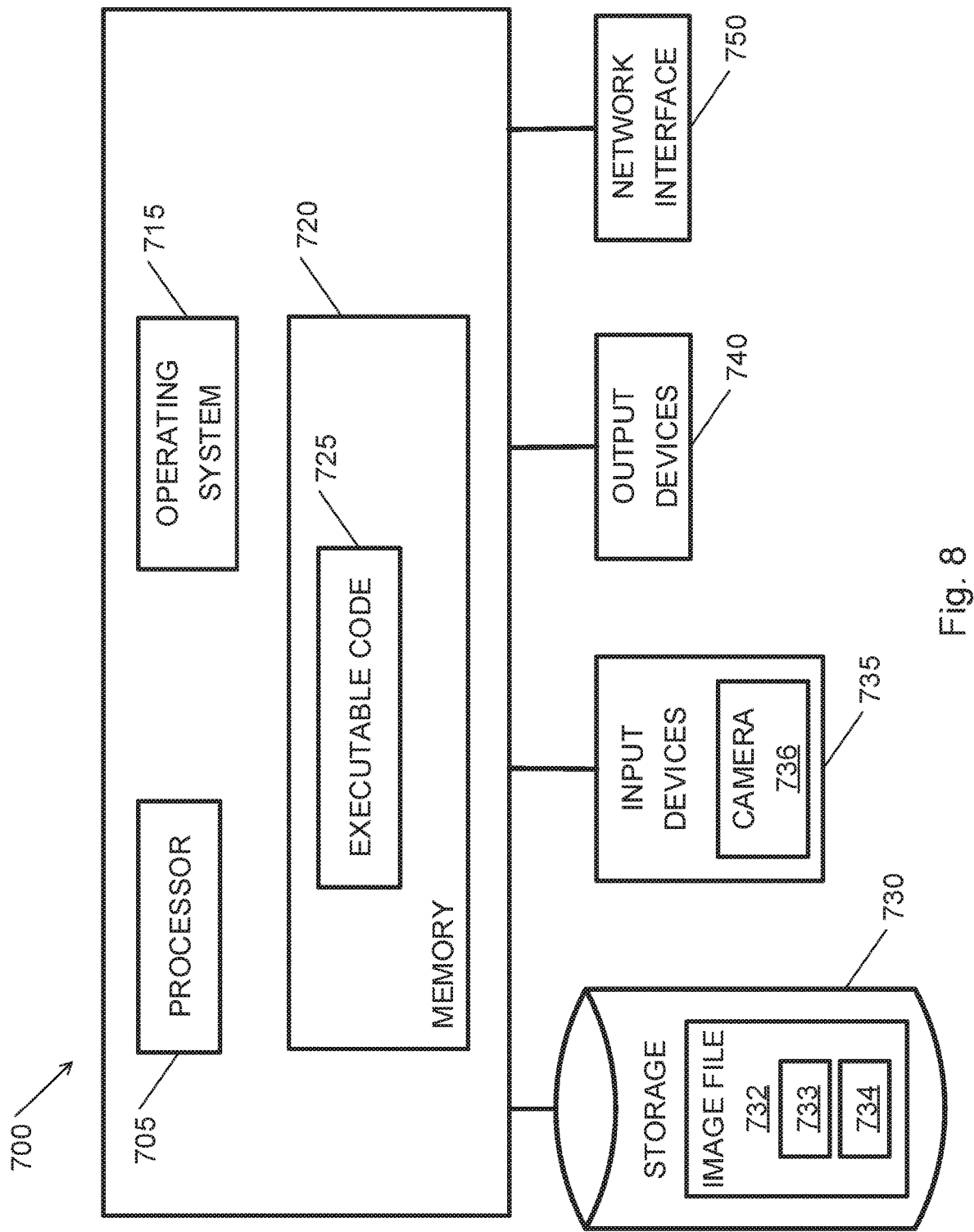
FIG. 8 illustrates an example computing device according to an embodiment of the invention.

FIG. 8 illustrates an example computing device according to an embodiment of the invention. For example, a computing device 700 with a processor 705 may be used to select a subset of digital images from a plurality of digital images, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a smart device, a smartphone, workstation or a personal computer, a laptop, or may be at least partially implemented by one or more remote servers (e.g., in the "cloud").

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include code for selecting a subset of digital images from a plurality of digital images, according to embodiments of the invention.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 8 may be omitted. For example, memory 720 may be a non-volatile memory having the storage capacity of storage 730. Accordingly, although shown as a separate component, storage 730 may be embedded or included in memory 720. Storage 730 and or memory 720 may be configured to store an electronic or digital image gallery including image files 732, including a digital image 733 and metadata 734, and any other parameters required for performing embodiments of the invention.

Input devices 735 may be or may include a camera 736 for capturing images, a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for selecting a subset of digital images from a plurality of digital images, the method comprising:
    obtaining image data and metadata of each digital image of the plurality of digital images, the metadata comprising a first set of features, and a second set of features;
    clustering the plurality of images based on at least one of the first set of features to generate clusters of images;
    selecting a set of M largest clusters of images, wherein M is a positive integer;
    scoring the images of each of the selected clusters based on at least one of the second set of features; and
    selecting a set of N images with a highest score from the selected clusters, wherein N is a positive integer,
    wherein clustering is performed by:
        obtaining feature values of each image from the metadata;
        setting an influence radius;
        assigning an influence function to each image, wherein the influence function is maximal at a position of the image and decays along the influence radius around the position of the image;
        for each image position, summing values of all the influence functions of all the images; and
        assigning images to clusters based on the influence values.

2. The method of claim 1, comprising:
    obtaining content of each of the images pertaining to the selected clusters; and
    obtaining user preferences,
    wherein the score is calculated to reflect the level of agreement between the user preferences and the content.

3. The method of claim 1, wherein the second set of features comprises image quality features, wherein scoring the images of each of the selected clusters is performed based on the image quality features.

4. The method of claim 1, comprising:
    obtaining user preferences, wherein scoring the images of each of the selected clusters is performed to reflect the level of agreement between the user preferences and the metadata features.

5. The method of claim 1, comprising:
    presenting the selected images to a user.

6. The method of claim 1, wherein the first set of features comprises time features related to a time in which the image was taken, and location features related to a location in which the image was taken, wherein clustering comprises:
    clustering the plurality of images based on the location features to generate location-based clusters; and
    clustering the plurality of images based on the time features to generate time-based clusters.

7. The method of claim 6, wherein clustering comprises:
    clustering the location-based clusters based on time features to generate location-time clusters.

8. The method of claim 6, wherein clustering the plurality of images based on the time the image was taken is repeated for a plurality of time scales.

9. The method of claim 1, wherein assigning images to clusters comprises:
    repeating until all images are assigned to a cluster:
        selecting an image with the highest summed influence value, that is not yet assigned to a cluster, to be a center of a cluster; and
        assigning all images with a distance lower than the influence radius from the selected image to the cluster.

10. The method of claim 1, wherein the influence function decays linearly.

11. A method for selecting digital images from a plurality of digital images, the method comprising:
    obtaining image data and characteristics of each digital image from the plurality of digital images;
    grouping the plurality of digital images to time-based groups and location-based groups;
    selecting at least one group having the most digit images;
    ranking the digital images of each of the at least one selected group based on at least one quality characteristic of the digital images; and
    selecting N highest ranked digital image from the at least one selected group, wherein N is a positive integer,
    wherein grouping is performed by:
        obtaining feature values of each digital image from the characteristics;
        setting an influence radius;
        assigning an influence function to each digital image, wherein the influence function is maximal at a position of the digital image and decays along the influence radius around the position of the digital image;
        for each image position, summing values of all the influence functions of all the digital images; and
        assigning digital images to clusters based on the influence values.

12. The method of claim 11, wherein assigning digital images to clusters comprises:
    repeating until all digital images are assigned to a cluster:
        selecting a digital image with the highest summed influence value, that is not yet assigned to a cluster, to be a center of a cluster; and
        assigning all digital images with a distance lower than the influence radius from the selected image to the cluster.

13. A system for selecting a subset of digital images from a plurality of digital images, the system comprising:
    a memory; and
    a processor configured to:
        obtain a plurality of image files, each image file relating to a digital image of the plurality of digital images, each file comprising image data and metadata, the metadata comprising a first set of features, and a second set of features;
        cluster the plurality of images based on at least one of the first set of features to generate clusters of images;

select a set of M largest clusters of images, wherein M is a positive integer;
score the images of each of the selected clusters based on at least one of the second set of features; and
select a set of N images with a highest score from the selected clusters, wherein N is a positive integer,
wherein the processor is configured to cluster the plurality of images by:
  obtaining feature values of each image from the metadata;
  setting an influence radius;
  assigning an influence function to each image, wherein the influence function is maximal at a position of the image and decays along the influence radius around the position of the image:
  for each image position, summing values of all the influence functions of all the images; and
  assigning images to clusters based on the influence values.

14. The system of claim 13, wherein the processor is configured to:
  obtain content of each of the images pertaining to the selected clusters;
  obtain user preferences; and
  calculate the score to reflect the level of agreement between the user preferences and the content.

15. The system of claim 13, wherein the second set of features comprises image quality features, wherein the processor is configured to score the images of each of the selected clusters based on the image quality features.

16. The system of claim 13, wherein the processor is configured to:
  obtain user preferences; and
  score the images of each of the selected clusters to reflect the level of agreement between the user preferences and the metadata features.

17. The system of claim 13, wherein the first set of features comprises time features related to a time in which the image was taken, and location features related to a location in which the image was taken, wherein the processor is configured to cluster the plurality of images by:
  clustering the plurality of images based on the location features to generate location-based clusters; and
  clustering the plurality of images based on the time features to generate time-based clusters.

18. The system of claim 13, wherein the processor is configured to cluster the plurality of images by:
  clustering the location-based clusters based on time features to generate location-time clusters; and
  repeating clustering the plurality of images based on the time the image was taken for a plurality of time scales.

19. The system of claim 13, wherein the processor is configured to assign images to clusters by:
  repeating until all images are assigned to a cluster:
    selecting an image with the highest summed influence value, that is not yet assigned to a cluster, to be a center of a cluster; and
    assigning all images with a distance lower than the influence radius from the selected image to the cluster.

20. The system of claim 13, wherein the influence function decays linearly.

* * * * *